(12) United States Patent
Tang et al.

(10) Patent No.: US 9,977,142 B2
(45) Date of Patent: May 22, 2018

(54) EFFICIENT LINE SEARCH METHODS FOR MULTI-PARAMETER FULL WAVEFIELD INVERSION

(71) Applicants: Yaxun Tang, Spring, TX (US); Gboyega Ayeni, Houston, TX (US)

(72) Inventors: Yaxun Tang, Spring, TX (US); Gboyega Ayeni, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 396 days.

(21) Appl. No.: 14/670,039

(22) Filed: Mar. 26, 2015

(65) Prior Publication Data
US 2015/0323689 A1  Nov. 12, 2015

Related U.S. Application Data

(60) Provisional application No. 61/990,860, filed on May 9, 2014.

(51) Int. Cl.
*G01V 1/30* (2006.01)
*G01V 1/32* (2006.01)
*G01V 1/28* (2006.01)

(52) U.S. Cl.
CPC .............. *G01V 1/32* (2013.01); *G01V 1/282* (2013.01); *G01V 1/303* (2013.01); *G01V 1/306* (2013.01);
(Continued)

(58) Field of Classification Search
CPC .......... G01V 1/32; G01V 1/282; G01V 1/306
See application file for complete search history.

(56) References Cited

U.S. PATENT DOCUMENTS 3,812,457 A   5/1974  Weller
3,864,667 A   2/1975  Bahjat
(Continued)

FOREIGN PATENT DOCUMENTS

AU   2015256626 A1 * 11/2016  ............... G01V 1/32
CA   2 796 631       11/2011
(Continued)

OTHER PUBLICATIONS

Tarantola, A. (1986), "A strategy for nonlinear elastic inversion of seismic reflection data," *Geophysics* 51(10), pp. 1893-1903.
(Continued)

*Primary Examiner* — Laura Menz
(74) *Attorney, Agent, or Firm* — ExxonMobil Upstream Research Company Law Department

(57) ABSTRACT

Method for simultaneously inverting full-wavefield seismic data (51) for multiple classes of physical property parameters (e.g., velocity and anisotropy) by computing the gradient (53), i.e. search direction (54), of an objective function for each class of parameters, then applying (preferably exhaustive) first-pass independent line searches to each parameter class to obtain the corresponding step size (55) along the search direction for each parameter class; then without yet updating the model, using the step sizes to define a relative scaling between gradients of all parameter classes. Next, each scaled search direction is recombined to form a new search direction (56), and a new second-pass line search is performed along the new search direction (57), and all parameters are simultaneously updated with the resulting step size (58). Alternatively to the preceding alternating two-pass embodiment, the model may be updated after each first-pass line search, and no second-pass line search is performed.

8 Claims, 5 Drawing Sheets

(52) U.S. Cl.
CPC ...... *G01V 2210/42* (2013.01); *G01V 2210/63* (2013.01)

(56) References Cited

U.S. PATENT DOCUMENTS

| | | | |
|---|---|---|---|
| 4,159,463 A | 6/1979 | Silverman | |
| 4,168,485 A | 9/1979 | Payton et al. | |
| 4,545,039 A | 10/1985 | Savit | |
| 4,562,650 A | 1/1986 | Nagasawa et al. | |
| 4,575,830 A | 3/1986 | Ingram et al. | |
| 4,594,662 A | 6/1986 | Devaney | |
| 4,636,957 A | 1/1987 | Vannier et al. | |
| 4,675,851 A | 6/1987 | Savit et al. | |
| 4,686,654 A | 8/1987 | Savit | |
| 4,707,812 A | 11/1987 | Martinez | |
| 4,715,020 A | 12/1987 | Landrum, Jr. | |
| 4,766,574 A | 8/1988 | Whitmore et al. | |
| 4,780,856 A | 10/1988 | Becquey | |
| 4,823,326 A | 4/1989 | Ward | |
| 4,924,390 A | 5/1990 | Parsons et al. | |
| 4,953,657 A | 9/1990 | Edington | |
| 4,969,129 A | 11/1990 | Currie | |
| 4,982,374 A | 1/1991 | Edington et al. | |
| 5,260,911 A | 11/1993 | Mason et al. | |
| 5,469,062 A | 11/1995 | Meyer, Jr. | |
| 5,583,825 A | 12/1996 | Carrazzone et al. | |
| 5,677,893 A | 10/1997 | de Hoop et al. | |
| 5,715,213 A | 2/1998 | Allen | |
| 5,717,655 A | 2/1998 | Beasley | |
| 5,719,821 A | 2/1998 | Sallas et al. | |
| 5,721,710 A | 2/1998 | Sallas et al. | |
| 5,790,473 A | 8/1998 | Allen | |
| 5,798,982 A | 8/1998 | He et al. | |
| 5,822,269 A | 10/1998 | Allen | |
| 5,838,634 A | 11/1998 | Jones et al. | |
| 5,852,588 A | 12/1998 | de Hoop et al. | |
| 5,878,372 A | 3/1999 | Tabarovsky et al. | |
| 5,920,838 A | 7/1999 | Norris et al. | |
| 5,924,049 A | 7/1999 | Beasley et al. | |
| 5,999,488 A | 12/1999 | Smith | |
| 5,999,489 A | 12/1999 | Lazaratos | |
| 6,014,342 A | 1/2000 | Lazaratos | |
| 6,021,094 A | 2/2000 | Ober et al. | |
| 6,021,379 A * | 2/2000 | Duren | G01V 1/282 367/73 |
| 6,028,818 A | 2/2000 | Jeffryes | |
| 6,058,073 A | 5/2000 | VerWest | |
| 6,125,330 A | 9/2000 | Robertson et al. | |
| 6,219,621 B1 | 4/2001 | Hornbostel | |
| 6,225,803 B1 | 5/2001 | Chen | |
| 6,311,133 B1 | 10/2001 | Lailly et al. | |
| 6,317,695 B1 | 11/2001 | Zhou et al. | |
| 6,327,537 B1 | 12/2001 | Ikelle | |
| 6,374,201 B1 | 4/2002 | Grizon et al. | |
| 6,381,543 B1 | 4/2002 | Guerillot et al. | |
| 6,388,947 B1 | 5/2002 | Washbourne et al. | |
| 6,480,790 B1 | 11/2002 | Calvert et al. | |
| 6,522,973 B1 | 2/2003 | Tonellot et al. | |
| 6,545,944 B2 | 4/2003 | de Kok | |
| 6,549,854 B1 | 4/2003 | Malinverno et al. | |
| 6,574,564 B2 | 6/2003 | Lailly et al. | |
| 6,593,746 B2 | 7/2003 | Stolarczyk | |
| 6,662,147 B1 | 12/2003 | Fournier et al. | |
| 6,665,615 B2 | 12/2003 | Van Riel et al. | |
| 6,687,619 B2 | 2/2004 | Moerig et al. | |
| 6,687,659 B1 | 2/2004 | Shen | |
| 6,704,245 B2 | 3/2004 | Becquey | |
| 6,714,867 B2 | 3/2004 | Meunier | |
| 6,735,527 B1 | 5/2004 | Levin | |
| 6,754,590 B1 | 6/2004 | Moldoveanu | |
| 6,766,256 B2 | 7/2004 | Jeffryes | |
| 6,826,486 B1 | 11/2004 | Malinverno | |
| 6,836,448 B2 | 12/2004 | Robertsson et al. | |
| 6,842,701 B2 | 1/2005 | Moerig et al. | |
| 6,859,734 B2 | 2/2005 | Bednar | |
| 6,865,487 B2 | 3/2005 | Charron | |
| 6,865,488 B2 | 3/2005 | Moerig et al. | |
| 6,876,928 B2 | 4/2005 | Van Riel et al. | |
| 6,882,938 B2 | 4/2005 | Vaage et al. | |
| 6,882,958 B2 | 4/2005 | Schmidt et al. | |
| 6,901,333 B2 | 5/2005 | Van Riel et al. | |
| 6,903,999 B2 | 6/2005 | Curtis et al. | |
| 6,905,916 B2 | 6/2005 | Bartsch et al. | |
| 6,906,981 B2 | 6/2005 | Vauge | |
| 6,927,698 B2 | 8/2005 | Stolarczyk | |
| 6,944,546 B2 | 9/2005 | Xiao et al. | |
| 6,947,843 B2 | 9/2005 | Fisher et al. | |
| 6,970,397 B2 | 11/2005 | Castagna et al. | |
| 6,977,866 B2 | 12/2005 | Huffman | |
| 6,999,880 B2 | 2/2006 | Lee | |
| 7,046,581 B2 | 5/2006 | Calvert | |
| 7,050,356 B2 | 5/2006 | Jeffryes | |
| 7,069,149 B2 | 6/2006 | Goff et al. | |
| 7,027,927 B2 | 7/2006 | Routh et al. | |
| 7,072,767 B2 | 7/2006 | Routh et al. | |
| 7,092,823 B2 | 8/2006 | Lailly et al. | |
| 7,110,900 B2 | 9/2006 | Adler et al. | |
| 7,184,367 B2 | 2/2007 | Yin | |
| 7,230,879 B2 | 6/2007 | Herkenoff et al. | |
| 7,271,747 B2 | 9/2007 | Baraniuk et al. | |
| 7,330,799 B2 | 2/2008 | Lefebvre et al. | |
| 7,337,069 B2 | 2/2008 | Masson et al. | |
| 7,373,251 B2 | 5/2008 | Hamman et al. | |
| 7,373,252 B2 | 5/2008 | Sherrill et al. | |
| 7,376,046 B2 | 5/2008 | Jeffryes | |
| 7,376,539 B2 | 5/2008 | Lecomte | |
| 7,400,978 B2 | 7/2008 | Langlais et al. | |
| 7,436,734 B2 | 10/2008 | Krohn | |
| 7,480,206 B2 | 1/2009 | Hill | |
| 7,584,056 B2 | 9/2009 | Koren | |
| 7,599,798 B2 | 10/2009 | Beasley et al. | |
| 7,602,670 B2 | 10/2009 | Jeffryes | |
| 7,616,523 B1 | 11/2009 | Tabti et al. | |
| 7,620,534 B2 | 11/2009 | Pita et al. | |
| 7,620,536 B2 | 11/2009 | Chow | |
| 7,646,924 B2 | 1/2010 | Donoho | |
| 7,672,194 B2 | 3/2010 | Jeffryes | |
| 7,672,824 B2 | 3/2010 | Dutta et al. | |
| 7,675,815 B2 | 3/2010 | Saenger et al. | |
| 7,679,990 B2 | 3/2010 | Herkenhoff et al. | |
| 7,684,281 B2 | 3/2010 | Vaage et al. | |
| 7,710,821 B2 | 5/2010 | Robertsson et al. | |
| 7,715,985 B2 | 5/2010 | Van Manen et al. | |
| 7,715,986 B2 | 5/2010 | Nemeth et al. | |
| 7,725,266 B2 * | 5/2010 | Sirgue | G01V 1/28 166/254.1 |
| 7,791,980 B2 | 9/2010 | Robertsson et al. | |
| 7,835,072 B2 | 11/2010 | Lzumi | |
| 7,840,625 B2 | 11/2010 | Candes et al. | |
| 7,940,601 B2 | 5/2011 | Ghosh | |
| 8,121,823 B2 | 2/2012 | Krebs et al. | |
| 8,248,886 B2 | 8/2012 | Neelamani et al. | |
| 8,428,925 B2 | 4/2013 | Krebs et al. | |
| 8,437,998 B2 | 5/2013 | Routh et al. | |
| 8,547,794 B2 | 10/2013 | Gulati et al. | |
| 8,688,381 B2 | 4/2014 | Routh et al. | |
| 8,781,748 B2 | 7/2014 | Laddoch et al. | |
| 9,348,050 B2 * | 5/2016 | Krohn | G01V 1/364 |
| 2002/0099504 A1 | 7/2002 | Cross et al. | |
| 2002/0120429 A1 | 8/2002 | Ortoleva | |
| 2002/0183980 A1 | 12/2002 | Guillaume | |
| 2004/0199330 A1 * | 10/2004 | Routh | G01V 1/28 702/14 |
| 2004/0225438 A1 | 11/2004 | Okoniewski et al. | |
| 2006/0235666 A1 | 10/2006 | Assa et al. | |
| 2007/0036030 A1 | 2/2007 | Baumel et al. | |
| 2007/0038691 A1 | 2/2007 | Candes et al. | |
| 2007/0274155 A1 | 11/2007 | Ikelle | |
| 2007/0282535 A1 * | 12/2007 | Sirgue | G01V 1/28 702/14 |
| 2008/0175101 A1 | 7/2008 | Saenger et al. | |
| 2008/0306692 A1 | 12/2008 | Singer et al. | |
| 2009/0006054 A1 | 1/2009 | Song | |
| 2009/0067041 A1 | 3/2009 | Krauklis et al. | |

(56) References Cited

U.S. PATENT DOCUMENTS

| | | |
|---|---|---|
| 2009/0070042 A1 | 3/2009 | Birchwood et al. |
| 2009/0083006 A1 | 3/2009 | Mackie |
| 2009/0164186 A1 | 6/2009 | Haase et al. |
| 2009/0164756 A1 | 6/2009 | Dokken et al. |
| 2009/0187391 A1 | 7/2009 | Wendt et al. |
| 2009/0248308 A1 | 10/2009 | Luling |
| 2009/0254320 A1 | 10/2009 | Lovatini et al. |
| 2009/0259406 A1* | 10/2009 | Khadhraoui .......... G01V 1/288 702/14 |
| 2010/0008184 A1 | 1/2010 | Hegna et al. |
| 2010/0018718 A1* | 1/2010 | Krebs .................... G01V 1/28 166/369 |
| 2010/0039894 A1 | 2/2010 | Abma et al. |
| 2010/0054082 A1 | 3/2010 | McGarry et al. |
| 2010/0088035 A1 | 4/2010 | Etgen et al. |
| 2010/0103772 A1 | 4/2010 | Eick et al. |
| 2010/0118651 A1 | 5/2010 | Liu et al. |
| 2010/0142316 A1 | 6/2010 | Keers et al. |
| 2010/0161233 A1 | 6/2010 | Saenger et al. |
| 2010/0161234 A1 | 6/2010 | Saenger et al. |
| 2010/0185422 A1 | 7/2010 | Hoversten |
| 2010/0208554 A1 | 8/2010 | Chiu et al. |
| 2010/0212902 A1 | 8/2010 | Baumstein et al. |
| 2010/0246324 A1 | 9/2010 | Dragoset, Jr. et al. |
| 2010/0265797 A1 | 10/2010 | Robertsson et al. |
| 2010/0270026 A1 | 10/2010 | Lazaratos et al. |
| 2010/0286919 A1 | 11/2010 | Lee et al. |
| 2010/0299070 A1 | 11/2010 | Abma |
| 2011/0000678 A1* | 1/2011 | Krebs .................... G01V 1/282 166/369 |
| 2011/0040926 A1 | 2/2011 | Donderici et al. |
| 2011/0051553 A1 | 3/2011 | Scott et al. |
| 2011/0090760 A1 | 4/2011 | Rickett et al. |
| 2011/0131020 A1 | 6/2011 | Meng |
| 2011/0134722 A1 | 6/2011 | Virgilio et al. |
| 2011/0182141 A1 | 7/2011 | Zhamikov et al. |
| 2011/0182144 A1 | 7/2011 | Gray |
| 2011/0191032 A1 | 8/2011 | Moore |
| 2011/0194379 A1 | 8/2011 | Lee et al. |
| 2011/0222370 A1 | 9/2011 | Downton et al. |
| 2011/0227577 A1 | 9/2011 | Zhang et al. |
| 2011/0235464 A1 | 9/2011 | Brittan et al. |
| 2011/0238390 A1 | 9/2011 | Krebs et al. |
| 2011/0246140 A1 | 10/2011 | Abubakar et al. |
| 2011/0267921 A1 | 11/2011 | Mortel et al. |
| 2011/0267923 A1 | 11/2011 | Shin |
| 2011/0276320 A1 | 11/2011 | Krebs et al. |
| 2011/0288831 A1 | 11/2011 | Tan et al. |
| 2011/0299361 A1 | 12/2011 | Shin |
| 2011/0320180 A1 | 12/2011 | Ai-Saleh |
| 2012/0010862 A1 | 1/2012 | Costen |
| 2012/0014215 A1 | 1/2012 | Saenger et al. |
| 2012/0014216 A1 | 1/2012 | Saenger et al. |
| 2012/0051176 A1 | 3/2012 | Liu |
| 2012/0073824 A1* | 3/2012 | Routh .................... G01V 1/28 166/369 |
| 2012/0073825 A1* | 3/2012 | Routh .................... G01V 1/28 166/369 |
| 2012/0082344 A1 | 4/2012 | Donoho |
| 2012/0143506 A1* | 6/2012 | Routh .................... G01V 1/282 702/2 |
| 2012/0215506 A1 | 8/2012 | Rickett et al. |
| 2012/0218859 A1 | 8/2012 | Soubaras |
| 2012/0275264 A1 | 11/2012 | Kostov et al. |
| 2012/0275267 A1 | 11/2012 | Neelamani et al. |
| 2012/0290214 A1 | 11/2012 | Huo et al. |
| 2012/0314538 A1* | 12/2012 | Washbourne ............ G01V 1/30 367/49 |
| 2012/0316790 A1* | 12/2012 | Washbourne .......... G01V 1/307 702/14 |
| 2012/0316791 A1* | 12/2012 | Shah .................... G01V 1/282 702/14 |
| 2012/0316844 A1* | 12/2012 | Shah .................... G01V 99/005 703/2 |
| 2013/0060539 A1* | 3/2013 | Baumstein ............... G01V 1/28 703/2 |
| 2013/0081752 A1 | 4/2013 | Kurimura et al. |
| 2013/0138408 A1* | 5/2013 | Lee ........................ G06F 17/16 703/2 |
| 2013/0238246 A1 | 9/2013 | Krebs et al. |
| 2013/0279290 A1 | 10/2013 | Poole |
| 2013/0282292 A1 | 10/2013 | Wang et al. |
| 2013/0311149 A1* | 11/2013 | Tang ...................... G06F 17/50 703/2 |
| 2013/0311151 A1 | 11/2013 | Plessix |
| 2014/0200816 A1* | 7/2014 | Peng .................... G01V 1/32 702/16 |
| 2014/0350861 A1 | 11/2014 | Wang et al. |
| 2014/0358504 A1* | 12/2014 | Baumstein ........... G01V 99/005 703/2 |
| 2014/0372043 A1* | 12/2014 | Hu ........................ G01V 1/303 702/16 |
| 2015/0185345 A1* | 7/2015 | Albertin ................. G01V 1/362 702/14 |
| 2015/0323688 A1* | 11/2015 | Peng .................... G01V 1/32 702/16 |
| 2015/0323689 A1* | 11/2015 | Tang .................... G01V 1/32 702/14 |
| 2016/0274256 A1* | 9/2016 | Coates .................. G01V 1/282 |
| 2017/0242142 A1* | 8/2017 | Jiao ...................... G01V 1/305 |

FOREIGN PATENT DOCUMENTS

| | | | |
|---|---|---|---|
| CA | 2947847 A1 * | 11/2015 | ............... G01V 1/32 |
| CN | 103091711 B | 9/2015 | |
| CN | 106461802 A * | 2/2017 | ............... G01V 1/32 |
| EP | 1 094 338 | 4/2001 | |
| EP | 1 746 443 | 1/2007 | |
| EP | 3140675 A1 * | 3/2017 | ............... G01V 1/32 |
| GB | 2 390 712 | 1/2004 | |
| GB | 2 391 665 | 2/2004 | |
| KR | 20160149308 A * | 12/2016 | ............... G01V 1/32 |
| MX | 2016013366 A * | 1/2017 | ............... G01V 1/32 |
| WO | WO 2006/037815 | 4/2006 | |
| WO | WO 2007/046711 | 4/2007 | |
| WO | WO 2008/042081 | 4/2008 | |
| WO | WO 2008/123920 | 10/2008 | |
| WO | WO 2009/067041 | 5/2009 | |
| WO | WO 2009/117174 | 9/2009 | |
| WO | WO 2010/085822 | 7/2010 | |
| WO | WO 2011/040926 | 4/2011 | |
| WO | WO 2011/091216 | 7/2011 | |
| WO | WO 2011/093945 | 8/2011 | |
| WO | WO 2012/024025 | 2/2012 | |
| WO | WO 2012/041834 | 4/2012 | |
| WO | WO 2012/083234 | 6/2012 | |
| WO | WO 2012/134621 | 10/2012 | |
| WO | WO 2012/170201 | 12/2012 | |
| WO | WO 2013/081752 | 6/2013 | |
| WO | WO 2015171215 A1 * | 11/2015 | ............... G01V 1/32 |

OTHER PUBLICATIONS

Tarantola, A. (1988), "Theoretical background for the inversion of seismic wavefo is, including elasticity and attenuation," *Pure and Applied Geophysics* 128, pp. 365-399.

Tarantola, A. (2005), "Inverse Problem Theory and Methods for Model Parameter Estimation," *SIAM*, pp. 79.

Tarantola, A. (1984), "Inversion of seismic reflection data in the acoustic approximation," *Geophysics* 49, pp. 1259-1266.

Trantham, E.C. (1994), "Controlled-phase acquisition and processing," *SEG Expanded Abstracts* 13, pp. 890-894.

Tsvankin, I. (2001), "Seismic Signatures and Analysis of Reflection Data in Anisotropic Media," Elsevier Science, p. 8.

Valenciano, A.A. (2008), "Imaging by Wave-Equation Inversion," A Dissertation, Stanford University, 138 pgs.

van Groenestijn, G.J.A. et al. (2009), "Estimating primaries by sparse inversion and application to near-offset reconstruction," *Geophyhsics* 74(3), pp. A23-A28.

(56) References Cited

OTHER PUBLICATIONS van Manen, D.J. (2005), "Making wave by time reversal," SEG International Exposition and 75th Annual Meeting, *Expanded Abstracts*, pp. 1763-1766.
Verschuur, D.J. (2009), Target-oriented, least-squares imaging of blended data, 79th Annual Int'l. Meeting, *SEG Expanded Abstracts*, pp. 2889-2893.
Verschuur, D.J. et al. (1992), "Adaptive surface-related multiple elimination," *Geophysics* 57(9), pp. 1166-1177.
Verschuur, D.J. (1989), "Wavelet Estimation by Prestack Multiple Elimination," *SEG Expanded Abstracts* 8, pp. 1129-1132.
Versteeg, R. (1994), "The Marmousi experience: Velocity model determination on a synthetic complex data set," *The Leading Edge*, pp. 927-936.
Vigh, D. et al. (2008), "3D prestack plane-wave, full-waveform inversion," *Geophysics* 73(5), pp. VE135-VE144.
Wang, Y. (2007), "Multiple prediction through inversion: Theoretical advancements and real data application," *Geophysics* 72(2), pp. V33-V39.
Wang, K. et al. (2009), "Simultaneous full-wavefoim inversion for source wavelet and earth model," SEG Int'l. Expo. & Ann. Meeting, Expanded Abstracts, pp. 2537-2541.
Weglein, A.B. (2003), "Inverse scattering series and seismic exploration," *Inverse Problems* 19, pp. R27-R83.
Wong, M. et al. (2010), "Joint least-squares inversion of up- and down-going signal for ocean bottom data sets," *SEG Expanded Abstracts* 29, pp. 2752-2756.
Wu R-S. et al. (2006), "Directional illumination analysis using beamlet decomposition and propagation," *Geophysics* 71(4), pp. S147- S159.
Xia, J. et al. (2004), "Utilization of high-frequency Rayleigh waves in near-surface geophysics," *The Leading Edge*, pp. 753-759.
Xie, X. et al. (2002), "Extracting angle domain infoimation from migrated wavefield," *SEG Expanded Abstracts*21, pp. 1360-1363.
Xie, X.-B. et al. (2006), "Wave-equation-based seismic illumination analysis," *Geophysics* 71(5), pp. S169-S177.
Yang, K. et al. (2000), "Quasi-Orthogonal Sequences for Code-Division Multiple-Access Systems," *IEEE Transactions on Information Theory* 46(3), pp. 982-993.
Yoon, K. et al. (2004), "Challenges in reverse-time migration," *SEG Expanded Abstracts* 23, pp. 1057-1060.
Young, J. et al. (2011), "An application of random projection to parameter estimation in partial differential equations," SIAM, 20 pgs.
Zhang, Y. (2005), "Delayed-shot 3D depth migration," *Geophysics* 70, pp. E21-E28.
Ziolkowski, A. (1991), "Why don't we measure seismic signatures?," *Geophysics* 56(2), pp. 190-201.
Lin, Youzuo, et al., (2011), "Spatially-Variant Tikhonov Regularization for Double-Difference Waveform Inversion", *Los Alamos National Laboratory, Tenth Annual Conference on Carbon Capture and Sequestration*, pp. 1-8.
Beck, Amir, et al., (2013), "On the Convergence of Block Coordinate Descent Type Methods", *SIAM Journal on Optimization*, vol. 23, No. 4, pp. 1-26.
Mora, P. (1987), "Elastic Wavefield Inversion," PhD Thesis, Stanford University, pp. 22-25.
Mora, P. (1989), "Inversion = migration + tomography," *Geophysics* 64, pp. 888-901.
Nazarian, S. et al. (1983), "Use of spectral analysis of surface waves method for determination of moduli and thickness of pavement systems," *Transport Res. Record* 930, pp. 38-45.
Neelamani, R., (2008), "Simultaneous sourcing without compromise," 70th Annual Int'l. Conf. And Exh., EAGE, 5 pgs.
Neelamani, R. (2009), "Efficient seismic forward modeling using simultaneous sources and sparsity," *SEG Expanded Abstracts*, pp. 2107-2111.
Nocedal, J. et al. (2006), *"Numerical Optimization, Chapt. 7—Large-Scale Unconstrained Optimization,"* Springer, New York, 2nd Edition, pp. 165-176.

Nocedal, J. et al. (2000), "Numerical Optimization-Calculating Derivatives," Chapter 8, Springer Verlag, pp. 194-199.
Ostmo, S. et al. (2002), "Finite-difference iterative migration by linearized waveform inversion in the frequency domain," SEG Int'l. Expo. & 72nd Ann. Meeting, 4 pgs.
Park, C.B. et al. (1999), "Multichannel analysis of surface waves," *Geophysics* 64(3), pp. 800-808.
Park, C.B. et al. (2007), "Multichannel analysis of surface waves (MASW)—active and passive methods," *The Leading Edge*, pp. 60-64.
Pica, A. et al. (2005), "3D Surface-Related Multiple Modeling, Principles and Results," 2005 SEG Ann. Meeting, *SEG Expanded Abstracts* 24, pp. 2080-2083.
Plessix, R.E. et al. (2004), "Frequency-domain finite-difference amplitude preserving migration," *Geophys. J. Int.* 157, pp. 975-987.
Porter, R.P. (1989), "Generalized holography with application to inverse scattering and inverse source problems," In E. Wolf, editor. Progress in Optics XXVII, Elsevier, pp. 317-397.
Pratt, R.G. et al. (1998), "Gauss-Newton and full Newton methods in frequency-space seismic waveform inversion," *Geophys. J. Int.* 133, pp. 341-362.
Pratt, R.G. (1999), "Seismic waveform inversion in the frequency domain, Part 1: Theory and verification in a physical scale model," *Geophysics* 64, pp. 888-901.
Rawlinson, N. et al. (2008), "A dynamic objective function technique for generating multiple solution models in seismic tomography," *Geophys. J. Int.* 178, pp. 295-308.
Rayleigh, J.W.S. (1899), "On the transmission of light through an atmosphere containing small particles in suspension, and on the origin of the blue of the sky," Phil. Mag. 47, pp. 375-384.
Romero, L.A. et al. (2000), Phase encoding of shot records in prestack migration, *Geophysics* 65, pp. 426-436.
Ronen S. et al. (2005), "Imaging Downgoing waves from Ocean Bottom Stations," *SEG Expanded Abstracts*, pp. 963-967.
Routh, P. et al. (2011), "Encoded Simultaneous Source Full-Wavefield Inversion for Spectrally-Shaped Marine Streamer Data," SEG San Antonio 2011 Ann. Meeting, pp. 2433-2438.
Ryden, N. et al. (2006), "Fast simulated annealing inversion of surface waves on pavement using phase-velocity spectra," *Geophysics* 71(4), pp. R49-R58.
Sambridge, M.S. et al. (1991), "An Alternative Strategy for Non-Linear Inversion of Seismic Waveforms," *Geophysical Prospecting* 39, pp. 723-736.
Schoenberg, M. et al. (1989), "A calculus for finely layered anisotropic media," *Geophysics* 54, pp. 581-589.
Schuster, G.T. et al. (2010), "Theory of Multisource Crosstalk Reduction by Phase-Encoded Statics," SEG Denver 2010 Ann. Meeting, pp. 3110-3114.
Sears, T.J. et al. (2008), "Elastic full waveform inversion of multi-component OBC seismic data," *Geophysical Prospecting* 56, pp. 843-862.
Sheen, D-H. et al. (2006), "Time domain Gauss-Newton seismic waveform inversion in elastic media," Geophysics J. Int. 167, pp. 1373-1384.
Shen, P. et al. (2003), "Differential semblance velocity analysis by wave-equation migration," 73rd Ann. Meeting of Society of Exploration Geophysicists, 4 pgs.
Sheng, J. et al. (2006), "Early arrival waveform tomography on near-surface refraction data," *Geophysics* 71, pp. U47-U57.
Sheriff, R.E.et al. (1982), *"Exploration Seismology"*, pp. 134-135.
Shih, R-C. et al. (1996), "Iterative pre-stack depth migration with velocity analysis," *Terrestrial, Atmospheric & Oceanic Sciences* 7(2), pp. 149-158.
Shin, C. et al. (2001), "Waveform inversion using a logarithmic wavefield," *Geophysics* 49, pp. 592-606.
Simard, P.Y. et al. (1990), "Vector Field Restoration by the Method of Convex Projections," *Computer Vision, Graphics and Image Processing* 52, pp. 360-385.
Sirgue, L. (2004), "Efficient waveform inversion and imaging: A strategy for selecting temporal frequencies," *Geophysics* 69, pp. 231-248.

(56) References Cited

OTHER PUBLICATIONS

Soubaras, R. et al. (2007), "Velocity model building by semblance maximization of modulated-shot gathers," *Geophysics* 72(5), pp. U67-U73.

Spitz, S. (2008), "Simultaneous source separation: a prediction-subtraction approach," 78th Annual Int'l. Meeting, *SEG Expanded Abstracts*, pp. 2811-2815.

Stefani, J. (2007), "Acquisition using simultaneous sources," 69th Annual Conf. and Exh., *EAGE Extended Abstracts*, 5 pgs.

Symes, W.W. (2007), "Reverse time migration with optimal checkpointing," *Geophysics* 72(5), pp. P.SM213-P.SM221.

Symes, W.W. (2009), "Interface error analysis for numerical wave propagation," *Compu. Geosci.* 13, pp. 363-371.

Tang, Y. (2008), "Wave-equation Hessian by phase encoding," *SEG Expanded Abstracts* 27, pp. 2201-2205.

Tang, Y. (2009), "Target-oriented wave-equation least-squares migration/inversion with phase-encoded Hessian," *Geophysics* 74, pp. WCA95-WCA107.

Tang, Y. et al. (2010), "Preconditioning full waveform inversion with phase-encoded Hessian," *SEG Expanded Abstracts* 29, pp. 1034-1037.

Abt, D.L. et al. (2010), "North American lithospheric discontinuity structured imaged by Ps and Sp receiver functions", *J. Geophys. Res.*, 24 pgs.

Akerberg, P., et al. (2008), "Simultaneous source separation by sparse radon transfoim," 78th SEG Annual International Meeting, *Expanded Abstracts*, pp. 2801-2805.

Aki, K. et al. (1980), "Quantitative Seismology: Theory and Methods vol. I—Chapter 7—Surface Waves in a Vertically Heterogenous Medium," W.H. Freeman and Co., pp. 259-318.

Aki, K. et al. (1980), "Quantitative Seismology: Theory and Methods Volume I," W.H. Freeman and Co., p. 173.

Aki et al. (1980), "Quantitative Seismology, Theory and Methods," Chapter 5.20, W.H. Freeman & Co., pp. 133-155.

Amundsen, L. (2001), "Elimination of free-surface related multiples without need of the source wavelet," *Geophysics* 60(1), pp. 327-341.

Anderson, J.E. et al. (2008), "Sources Near the Free-Surface Boundary: Pitfalls for Elastic Finite-Difference Seismic Simulation and Multi-Grid Waveform Inversion," 70$^{th}$ EAGE Conf. & Exh., 4 pgs.

Barr, F.J. et al. (1989), "Attenuation of Water-Column Reverberations Using Pressure and Velocity Detectors in a Water-Bottom Cable," 59$^{th}$ Annual SEG meeting, *Expanded Abstracts*, pp. 653-656.

Baumstein, A. et al. (2009), "Scaling of the Objective Function Gradient for Full Wavefield Inversion," SEG Houston 2009 Int'l. Expo and Annual Meeting, pp. 224-2247.

Beasley, C. (2008), "A new look at marine simultaneous sources," *The Leading Edge* 27(7), pp. 914-917.

Beasley, C. (2012), "A 3D simultaneous source field test processed using alternating projections: a new active separation method," *Geophsyical Prospecting* 60, pp. 591-601.

Beaty, K.S. et al. (2003), "Repeatability of multimode Rayleigh-wave dispersion studies," *Geophysics* 68(3), pp. 782-790.

Beaty, K.S. et al. (2002), "Simulated annealing inversion of multimode Rayleigh wave dispersion waves for geological structure," *Geophys. J. Int.* 151, pp. 622-631.

Becquey, M. et al. (2002), "Pseudo-Random Coded Simultaneous Vibroseismics," SEG Int'l. Exposition and 72th Annl. Mtg., 4 pgs.

Ben-Hadj-Ali, H. et al. (2009), "Three-dimensional frequency-domain full waveform inversion with phase encoding," *SEG Expanded Abstracts*, pp. 2288-2292.

Ben-Hadj-Ali, H. et al. (2011), "An efficient frequency-domain full waveform inversion method using simultaneous encoded sources," *Geophysics* 76(4), pp. R109-R124.

Benitez, D. et al. (2001), "The use of the Hilbert transform in ECG signal analysis," *Computers in Biology and Medicine* 31, pp. 399-406.

Berenger, J-P. (1994), "A Perfectly Matched Layer for the Absorption of Electromagnetic Waves," *J. of Computational Physics* 114, pp. 185-200.

Berkhout, A.J. (1987), "Applied Seismic Wave Theory," Elsevier Science Publishers, p. 142.

Berkhout, A.J. (1992), "Areal shot record technology," *Journal of Seismic Exploration* 1, pp. 251-264.

Berkhout, A.J. (2008), "Changing the mindset in seismic data acquisition," *The Leading Edge* 27(7), pp. 924-938.

Beylkin, G. (1985), "Imaging of discontinuities in the inverse scattring problem by inversion of a causal generalized Radon transfaim," *J. Math. Phys.* 26, pp. 99-108.

Biondi, B. (1992), "Velocity estimation by beam stack," *Geophysics* 57(8), pp. 1034-1047.

Bonomi, E. et al. (2006), "Wavefield Migration plus Monte Carlo Imaging of 3D Prestack Seismic Data," *Geophysical Prospecting* 54, pp. 505-514.

Boonyasiriwat, C. et al. (2010), 3D Multisource Full-Wavefoim using Dynamic Random Phase Encoding, SEG Denver 2010 Annual Meeting, pp. 1044-1049.

Boonyasiriwat, C. et al. (2010), 3D Multisource Full-Waveform using Dynamic Random Phase Encoding, SEG Denver 2010 Annual Meeting, pp. 3120-3124.

Bunks, C., et al. (1995), "Multiscale seismic waveform inversion," *Geophysics* 60, pp. 1457-1473.

Burstedde, G. et al. (2009), "Algorithmic strategies for full wavefoiin inversion: 1D experiments," *Geophysics* 74(6), pp. WCC17-WCC46.

Chavent, G. et al. (1999), "An optimal true-amplitude least-squares prestack depth-migration operator," *Geophysics* 64(2), pp. 508-515.

Choi, Y. et al. (2011), "Application of encoded multisource waveform inversion to marine-streamer acquisition based on the global correlation," 73$^{rd}$ EAGE Conference, *Abstract*, pp. F026.

Choi, Y et al. (2012), "Application of multi-source wavefoini inversion to marine stream data using the global correlation noim," *Geophysical Prospecting* 60, pp. 748-758.

Clapp, R.G. (2009), "Reverse time migration with random boundaries," SEG International Exposition and Meeting, *Expanded Abstracts*, pp. 2809-2813.

Dai, W. et al. (2010), "3D Multi-source Least-squares Reverse Time Migration," SEG Denver 2010 Annual Meeting, pp. 3120-3124.

Delprat-Jannuad, F. et al. (2005), "A fundamental limitation for the reconstruction of impedance profiles from seismic data," *Geophysics* 70(1), pp. R1-R14.

Dickens, T.A. et al. (2011), RTM angle gathers using Poynting vectors, *SEG Expanded Abstracts* 30, pp. 3109-3113.

Donerici, B. et al. (1005), "Improved FDTD Subgridding Algorithms Via Digital Filtering and Domain Overriding," *IEEE Transactions on Antennas and Propagation* 53(9), pp. 2938-2951.

Downey, N. et al. (2011), "Random-Beam Full-Wavefield Inversion," 2011 San Antonio Annual Meeting, pp. 2423-2427.

Dunkin, J.W. et al. (1973), "Effect of Noimal Moveout on a Seismic Pluse," *Geophysics* 38(4), pp. 635-642.

Dziewonski A. et al. (1981), "Preliminary Reference Earth Model", *Phys. Earth Planet. Int.* 25(4), pp. 297-356.

Ernst, F.E. et al. (2000), "Tomography of dispersive media," *J. Acoust. Soc. Am* 108(1), pp. 105-116.

Ernst, F.E. et al. (2002), "Removal of scattered guided waves from seismic data," *Geophysics* 67(4), pp. 1240-1248.

Esmersoy, C. (1990), "Inversion of P and SV waves from multicomponent offset vertical seismic profiles", *Geophysics* 55(1), pp. 39-50.

Etgen, J.T. et al. (2007), "Computational methods for large-scale 3D acoustic finite-difference modeling: A tutorial," *Geophysics* 72(5), pp. SM223-SM230.

Fallat, M.R. et al. (1999), "Geoacoustic inversion via local, global, and hybrid algorithms," *Journal of the Acoustical Society of America* 105, pp. 3219-3230.

Fichtner, A. et al. (2006), "The adjoint method in seismology I. Theory," *Physics of the Earth and Planetary Interiors* 157, pp. 86-104.

Forbriger, T. (2003), "Inversion of shallow-seismic wavefields: I. Wavefield transformation," *Geophys. J. Int.* 153, pp. 719-734.

(56) References Cited

OTHER PUBLICATIONS

U.S. Appl. No. 14/329,431, filed Jul. 11, 2014, Krohn et al.
U.S. Appl. No. 14/330,767, filed Jul. 14, 2014, Tang et al.
Kennett, B.L.N. (1988), "Subspace methods for large inverse problems with multiple parameter classes," *Geophysical Journal* 94, pp. 237-247.
Young, Ma, "Image-guided full waveform inversion," CWP-578, 11 pgs.
Gao, H. et al. (2008), "Implementation of perfectly matched layers in an arbitrary geometrical boundary for leastic wave modeling," *Geophysics J. Int.* 174, pp. 1029-1036.
Gibson, B. et al. (1984), "Predictive deconvolution and the zero-phase source," *Geophysics* 49(4), pp. 379-397.
Godfrey, R. J. et al. (1998), "Imaging the Foiaven Ghost," *SEG Expanded Abstracts*, 4 pgs.
Griewank, A. (1992), "Achieving logarithmic growth of temporal and spatial complexity in reverse automatic differentiation," 1 *Optimization Methods and Software*, pp. 35-54.
Griewank, A. (2000), Evaluating Derivatives: Principles and Techniques of Algorithmic Differentiation, Society for Industrial and Applied Mathematics, 49 pgs.
Griewank, A. et al. (2000), "Algorithm 799: an implementation of checkpointing for the reverse or adjoint mode of computational differentiation," 26 *ACM Transactions on Mathematical Software*, pp. 19-45.
Griewank, A. et al. (1996), "Algorithm 755: A package for the automatic differentiation of algorithms written in C/C++," *ACM Transactions on Mathematical Software* 22(2), pp. 131-167.
Haber, E. et al. (2010), "An effective method for parameter estimation with PDE constraints with multiple right hand sides," Preprint—UBC http://www.math.ubc.ca/~haber/pubs/PdeOptStochV5.pdf.
Hampson, D.P. et al. (2005), "Simultaneous inversion of pre-stack seismic data," SEG 75th Annual Int'l. Meeting, *Expanded Abstracts*, pp. 1633-1637.
Heinkenschloss, M. (2008), :"Numerical Solution of Implicity Constrained Optimization Problems," CAAM Technical Report TR08-05, 25 pgs.
Helbig, K. (1994), "Foundations of Anisotropy for Exploration Seismics," Chapter 5, pp. 185-194.
Herrmann, F.J. (2010), "Randomized dimensionality reduction for full-waveform inversion," *EAGE abstract* G001, EAGE Barcelona meeting, 5 pgs.
Holschneider, J. et al. (2005), "Characterization of dispersive surface waves using continuous wavelet transforms," *Geophys. J. Int.* 163, pp. 463-478.
Hu, L.Z. et al. (1987), "Wave-field transformations of vertical seismic profiles," *Geophysics* 52, pp. 307-321.
Huang, Y. et al. (2012), "Multisource least-squares migration of marine streamer and land data with frequency-division encoding," *Geophysical Prospecting* 60, pp. 663-680.
Igel, H. et al. (1996), "Waveform inversion of marine reflection seismograms for P impedance and Poisson's ratio," *Geophys. J. Int.* 124, pp. 363-371.
Ikelle, L.T. (2007), "Coding and decoding: Seismic data modeling, acquisition, and processing," 77th Annual Int'l. Meeting, SEG Expanded Abstracts, pp. 66-70.
Jackson, D.R. et al. (1991), "Phase conjugation in underwater acoustics," *J. Acoust. Soc. Am.* 89(1), pp. 171-181.
Jing, X. et al. (2000), "Encoding multiple shot gathers in prestack migration," *SEG International Exposition and 70th Annual Meeting Expanded Abstracts*, pp. 786-789.
Kennett, B.L.N. (1991), "The removal of free surface interactions from three-component seismograms", *Geophys. J. Int.* 104, pp. 153-163.
Kennett, B.L.N. et al. (1988), "Subspace methods for large inverse problems with multiple parameter classes," *Geophysical J.* 94, pp. 237-247.
Krebs, J.R. (2008), "Fast Full-wavefield seismic inversion using encoded sources," *Geophysics* 74(6), pp. WCC177-WCC188.
Krohn, C.E. (1984), "Geophone ground coupling," *Geophysics* 49(6), pp. 722-731.
Kroode, F.T. et al. (2009), "Wave Equation Based Model Building and Imaging in Complex Settings," OTC 20215, 2009 Offshore Technology Conf., Houston, TX, May 4-7, 2009, 8 pgs.
Kulesh, M. et al. (2008), "Modeling of Wave Dispersion Using Continuous Wavelet Transforms Ii: Wavelet-based Frequency-velocity Analysis," *Pure Applied Geophysics* 165, pp. 255-270.
Lancaster, S. et al. (2000), "Fast-track 'colored' inversion," 70th SEG Ann. Meeting, *Expanded Abstracts*, pp. 1572-1575.
Lazaratos, S. et al. (2009), "Inversion of Pre-migration Spectral Shaping," 2009 SEG Houston Int'l. Expo. & Ann. Meeting, *Expanded Abstracts*, pp. 2383-2387.
Lazaratos, S. (2006), "Spectral Shaping Inversion for Elastic and Rock Property Estimation," *Research Disclosure*, Issue 511, pp. 1453-1459.
Lazaratos, S. et al. (2011), "Improving the convergence rate of full wavefield inversion using spectral shaping," *SEG Expanded Abstracts* 30, pp. 2428-2432.
Lecomte, I. (2008), "Resolution and illumination analyses in PSDM: A ray-based approach," The Leading Edge, pp. 650-663.
Lee, S. et al. (2010), "Subsurface parameter estimation in full wavefield inversion and reverse time migration," SEG Denver 2010 Annual Meeting, pp. 1065-1069.
Levanon, N. (1988), "Radar Principles," Chpt. 1, John Whiley & Sons, New York, pp. 1-18.
Liao, Q. et al. (1995), "2.5D full-wavefield viscoacoustic inversion," *Geophysical Prospecting* 43, pp. 1043-1059.
Liu, F. et al. (2007), "Reverse-time migration using one-way wavefield imaging condition," *SEG Expanded Abstracts* 26, pp. 2170-2174.
Liu, F. et al. (2011), "An effective imaging condition for reverse-time migration using wavefield decomposition," *Geophysics* 76, pp. S29-S39.
Maharramov, M. et al. (2007) , "Localized image-difference wave-equation tomography," SEG Annual Meeting, *Expanded Abstracts*, pp. 3009-3013.
Malmedy, V. et al. (2009), "Approximating Hessians in unconstrained optimization arising from discretized problems," *Computational Optimization and Applications*, pp. 1-16.
Marcinkovich, C. et al. (2003), "On the implementation of perfectly matched layers in a three-dimensional fourth-order velocity-stress finite difference scheme," *J. of Geophysical Research* 108(B5), 2276.
Martin, G.S. et al. (2006), "Marmousi2: An elastic upgrade for Mall iousi," *The Leading Edge*, pp. 156-166.
Meier, M.A. et al. (2009), "Converted wave resolution," *Geophysics*, 74(2):doi:10.1190/1.3074303, pp. Q1-Q16.
Moghaddam, P.P. et al. (2010), "Randomized full-waveform inversion: a dimenstionality-reduction approach," 80th SEG Ann. Meeting, *Expanded Abstracts*, pp. 977-982.
Mora, P. (1987), "Nonlinear two-dimensional elastic inversion of multi-offset seismic data," *Geophysics* 52, pp. 1211-1228.

\* cited by examiner

EFFICIENT LINE SEARCH METHODS FOR MULTI-PARAMETER FULL WAVEFIELD INVERSION

CROSS-REFERENCE TO RELATED APPLICATION

This application claims the benefit of U.S. Provisional Patent Application 61/990,860, filed May 9, 2014, entitled EFFICIENT LINE SEARCH METHODS FOR MULTI-PARAMETER FULL WAVEFIELD INVERSION, the entirety of which is incorporated by reference herein.

FIELD OF THE INVENTION

This disclosure relates generally to the field of geophysical prospecting for hydrocarbons and, more particularly, to seismic data processing. Specifically the disclosure relates to a method for performing efficient line searches in multi-parameter full wavefield inversion ("FWI") of seismic data to infer a subsurface physical property model. Such a model may be useful in exploration for, or production of, hydrocarbons.

BACKGROUND OF THE INVENTION

Full wavefield inversion is a nonlinear inversion technique that recovers the earth model by minimizing the mismatch between the simulated and the observed seismic wavefields. Due to the high computational cost associated with FWI, conventional implementations utilize local optimization techniques to estimate optimal model parameters. A widely used local optimization technique is the gradient-based first-order method, (e.g., steepest descent or nonlinear conjugate gradient), which utilizes only the gradient information of the objective function to define a search direction. Although a gradient-only first-order method is relatively efficient—it requires computing only the gradient of the objective function—its convergence is generally slow. The convergence of FWI can be improved significantly by using a second-order method. This improved convergence is achieved because second-order methods utilize both the gradient and curvature information of the objective function to determine an optimal search direction in model parameter space. (The search direction unit vector s is related to the model update process by $m_{updated}=m+\alpha s$, where $\alpha$ (a scalar) is the step size.)

The major difference between first and second order methods is that second-order methods precondition the gradient with the inverse Hessian (e.g., Gauss-Newton/Newton method), or with the inverse of a projected Hessian (e.g., subspace method). The Hessian is a matrix of second-order partial derivatives of the objective function with respect to the model parameters. In general, second-order methods are attractive not only because of their relative fast convergence rate, but also because of the capability to balance the gradients of different parameter classes and provide meaningful updates for parameter classes with different data sensitivities (e.g., velocity, anisotropy, attenuation, etc.) in the context of multi-parameter inversion. In second-order methods, optimum scaling of parameter classes using the Hessian is crucial in multi-parameter inversion, if such parameter classes are to be simultaneously inverted. However, because it is very expensive to compute the inverse of the Hessian, this is a major obstacle for wide adoption of second-order methods in practice. Another disadvantage of second-order methods is that if the objective function is not quadratic or convex (e.g., where the initial model is far from the true model), the Hessian or its approximation may not accurately predict the shape of the objective function. Hence, the gradients for different parameter classes may not be properly scaled, thereby resulting in suboptimal search directions.

SUMMARY OF THE INVENTION

In one embodiment, the invention is a method for iteratively inverting seismic data to simultaneously infer a model for at least two physical properties of the subsurface, said method comprising:
(a) for each physical property, computing a gradient of an objective function with respect to parameters of the physical property, said objective function measuring misfit between all or part of the seismic data and corresponding model-simulated seismic data;
(b) for each physical property, computing a search direction in model space from the gradient;
(c) alternating line searches between or among the search directions for the at least two physical properties to determine optimal step sizes along each of the search directions; and
(d) using the optimal step sizes to update the model.

BRIEF DESCRIPTION OF THE DRAWINGS

The present invention and its advantages will be better understood by referring to the following detailed description and the attached drawings in which.

Figure 1:
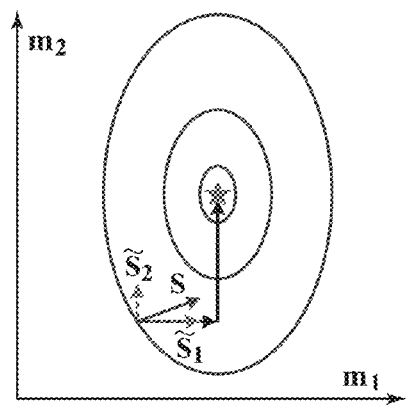
FIG. 1 illustrates the optimal search direction in the alternating one-pass line search embodiment of the present invention.

Due to patent rule restrictions on the use of color in drawings, some of FIGS. 4A-4F are black-and-white reproductions of drawings originally generated in color.

The invention will be described in connection with example embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION OF EXAMPLE EMBODIMENTS

The present invention bridges the gap between first-order and second-order optimization methods by using what may be called an alternating one/two pass line search method, which requires no explicit information from the Hessian matrix, but approximates the second-order information through successive line searches. It will be shown that the present inventive method can properly scale the gradients for parameter classes with different data sensitivity and can provide meaningful updates for multiple parameter classes simultaneously. In practice, the present inventive method can be more robust than the Hessian-based second-order method, because it does not assume that the objective function is quadratic, and it can also be significantly cheaper if each line search can be efficiently implemented.

Although, for simplicity, the theory is described using two parameter classes, the invention is applicable to simultaneous inversion of any number of parameter classes, and extension of the method to more than two parameter classes is straightforward. For the case where two parameter classes are to be inverted, the model can be expressed as a vector containing two different sub-models, i.e., $m=(m_1 \ m_2)^T$, where $m_1$ and $m_2$ are the first and second model parameter class, respectively, where T stands for the transpose. The search direction at a current iteration s is a concatenation of the search directions for both these parameter classes, and can be written as follows:

$$s = \begin{pmatrix} s_1 \\ s_2 \end{pmatrix}, \quad (1)$$

where $s_1$ and $s_2$ are the search directions of the first and second parameter class, respectively. The first-order based approach typically updates model m along direction s. One major issue of this approach is that if the model parameter classes are physical quantities with very different units and sensitivities to the FWI objective function (e.g., velocity, anisotropy, attenuation, etc.), the resulting search direction derived from the FWI gradient will typically have quite different magnitudes, i.e. the magnitude of $s_1$ may differ substantially from that of $s_2$. This often leads FWI to choose a convergence path along which it predominantly updates parameter classes that are more sensitive to the objective function, while keeping parameter classes that are less sensitive to the objective function barely updated. Consequently, FWI may converge to a suboptimal solution. Below are described two alternative embodiments of the present invention's alternating line-search-based approach, which address this issue, with the goal of providing optimal updates for all parameter classes simultaneously without biasing towards certain parameter classes due to different units or data sensitivity.

Method I: Alternating One-Pass Line Search

To start, two basis vectors are defined, each of which contains the search direction for a particular model parameter class:

$$\tilde{s}_1 = \begin{pmatrix} s_1 \\ 0 \end{pmatrix}, \quad \tilde{s}_2 = \begin{pmatrix} 0 \\ s_2 \end{pmatrix}, \quad (2)$$

where 0 denotes a vector containing zeros. Then, the original search direction can be written as the sum of the above two basis vectors, which are orthogonal to each other (i.e., $\tilde{s}_1 \cdot \tilde{s}_2 = 0$):

$$s = \tilde{s}_1 + \tilde{s}_2. \quad (3)$$

Figure 2:
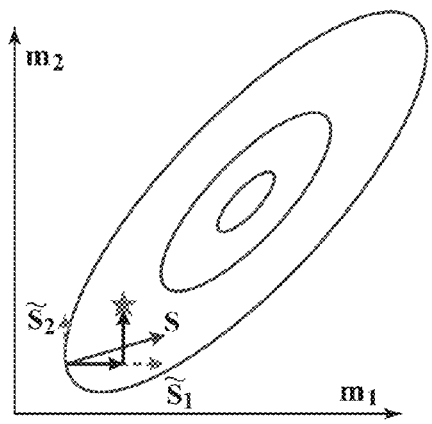
FIG. 2 illustrates a sub-optimal search direction that may result from the alternating one-pass line search embodiment of the present invention.
Figure 5:
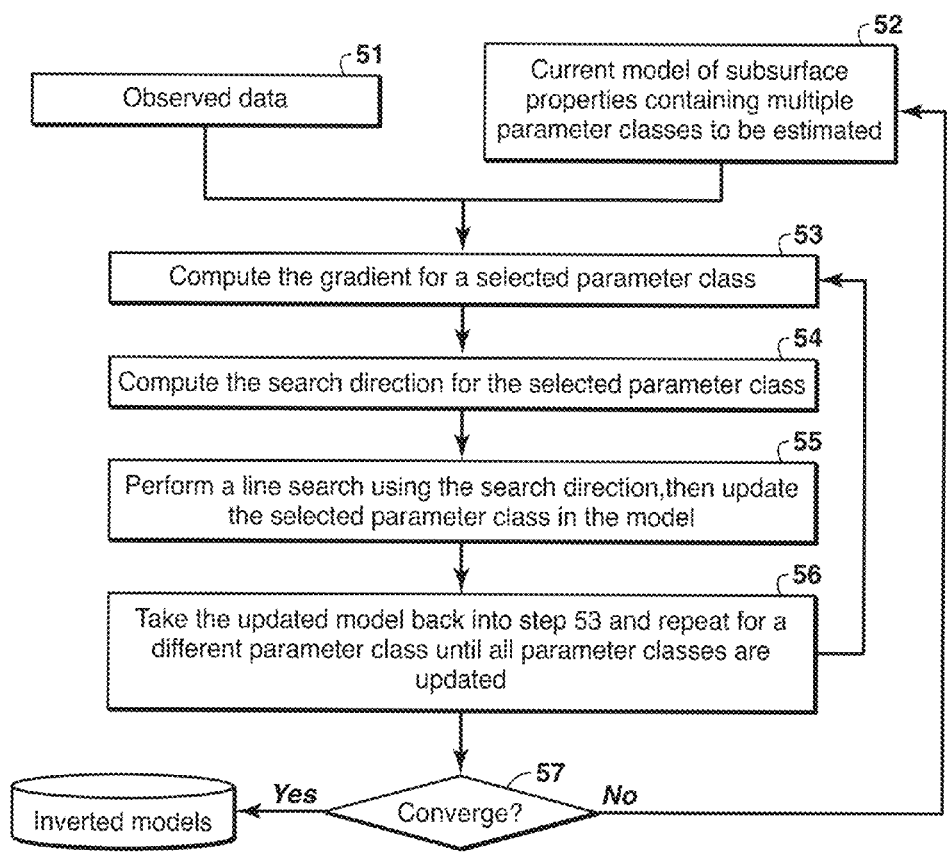
FIG. 5 is a flow chart showing basic steps in the alternating one-pass line search of the present inventive method.

In this first method, the two model parameter classes are updated in an alternating fashion, with basic steps shown in FIG. 5. The current model 52 is used to simulate predicted data, and that is combined with the measured data 51 to compute an objective function, and a gradient of the objective function with respect to the first model parameter is then computed in step 53 to yield a search direction $\tilde{s}_1$ in step 54. In step 55, a line search is performed along direction $\tilde{s}_1$ and the model is updated. Since $\tilde{s}_1$ is nonzero only for the first parameter class, only parameter class $m_1$ will be updated. After the model has been updated, a line search is then performed along direction $\tilde{s}_2$ and the model is updated again (step 56). In this case, since $\tilde{s}_2$ is nonzero only for the second parameter class, only parameter $m_2$ will be updated, as shown in FIG. 1. In this approach, one FWI iteration refers to the process of updating both parameter classes in this alternating manner, and at step 57 the process is repeated for another iteration unless it has converged according to some predetermined convergence criterion or has reached another stopping point. Because $m_1$ and $m_2$ are updated in an independent manner, the scaling-imbalance in the search directions (or gradients) described above is overcome. All parameter classes then receive significant updates in an alternating fashion. This method may be called the alternating one-pass line search. One potential drawback of this method is that the order of the successive line searches can influence the convergence path, and if the objective function has a relatively complicated shape, this may result in a zigzagged convergence path (FIG. 2).

In more detail, a line search involves model-simulating seismic data for various different "step" sizes along the search direction in the highly multi-dimensional model parameter space. The step size that minimizes the misfit between the model-simulated data and the measured data is selected. In the Method I described above, after the first physical property is updated in the model, then that updated model is used to simulate data for the line search to update the second physical property. Even though that second line search updates only the second physical property, the update to the first physical property from the first line search will affect the model simulated data for the second line search, and therefore will affect the resulting update to the second physical property.

Figure 3:
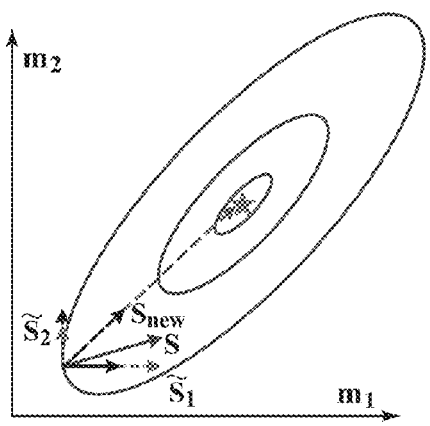
FIG. 3 illustrates the optimal search direction using the alternating two-pass line search embodiment of the present invention.

To further explain FIG. 1, the solution is represented by the star in the center of the objective function contours, which are ellipses instead of circles because model parameter $m_1$ is more sensitive than $m_2$ to the objective function. FIG. 1 shows that in this situation the solution can be reached in a single cycle of the iteration process by making two independent steps using the alternating one-pass line search embodiment of the present inventive method. FIG. 1 also shows that the traditional line search s is thrown off of the right direction by the different sensitivities, and will require more iterations to reach the solution. FIG. 2 shows where the alternating one-pass line search might be problematic, i.e., when $m_1$ and $m_2$ are coupled, as shown by the objective function contour, which is tilted, meaning strong correlation between these two parameter classes. Under such circumstances, the alternating one-pass line search might require additional iterations to find an optimal search direction. FIG. 3 shows how the alternating two-pass line search embodiment of the present invention, explained next, can solve this problem.

Method II: Alternating Two-Pass Line Search

Figure 6:
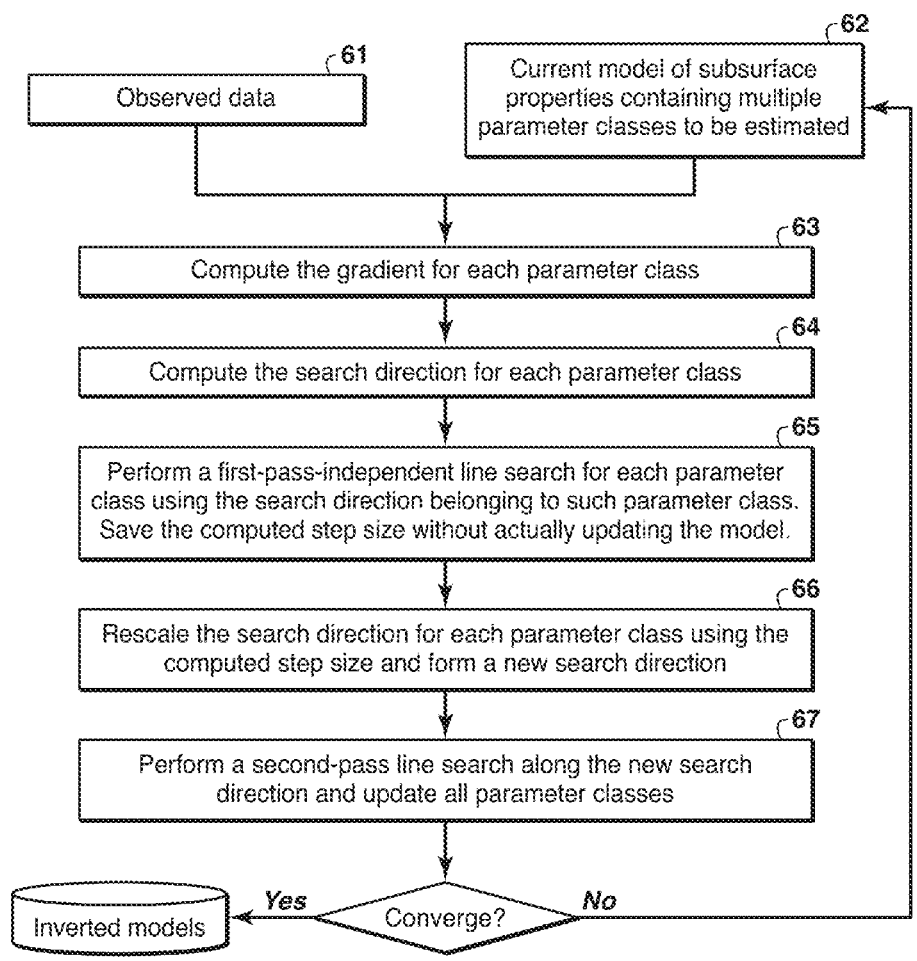
FIG. 6 is a flow chart showing basic steps in the alternating two-pass line search of the present inventive method.

Some of the above-identified drawbacks of Method I can be mitigated by a modification to the Method I. As indicated in FIG. 6, the observed data 61 and the current subsurface model 62 are used in computing the gradient of the objective function for each parameter class (step 63), resulting in a search direction for each parameter class (64). In step 65, a first-pass independent line search is performed for each parameter class using the search direction computed in step 64 for such parameter class. The computed step sizes are saved, but no model update is performed yet. In step 66, this modified approach is similar in one of its aspects to the so-called subspace method (Kennett, et al., 1998) in that instead of updating all model classes in an alternating fashion, it first recombines the two basis vectors $\tilde{s}_1$ and $\tilde{s}_2$ using two scaling factors $\alpha$ and $\beta$, i.e. step sizes, to form a new search direction as follows:

$$s_{new} = \alpha \tilde{s}_1 + \beta \tilde{s}_2. \quad (4)$$

Once this new combined search direction is obtained, a second-pass line search (utilizing the new search direction) is performed to update both parameter classes simultaneously (step 67). A main difference between this approach and the well-known subspace approach (Kennett, et al., 1988) is how the scaling factors $\alpha$ and $\beta$ are estimated. In the subspace approach, the scaling factors are determined by inverting the following projected Hessian matrix:

$$\begin{pmatrix} \tilde{s}_1^T H \tilde{s}_1 & \tilde{s}_1^T H \tilde{s}_2 \\ \tilde{s}_2^T H \tilde{s}_1 & \tilde{s}_2^T H \tilde{s}_2 \end{pmatrix} \begin{pmatrix} \alpha \\ \beta \end{pmatrix} = - \begin{pmatrix} g^T \tilde{s}_1 \\ g^T \tilde{s}_2 \end{pmatrix}, \quad (5)$$

where H is the Hessian matrix. Instead of using the Hessian, preferred embodiments of Method II estimate the optimal scaling factors through line searches (step 65). In this two-parameter example of the Method II of the present disclosure, two independent line searches are first performed as follows:
(i) First, determine the optimal step size $\alpha$ such that it minimizes the objective function along the search direction defined by $\tilde{s}_1$, but do not actually update the model;
(ii) then determine the optimal step size $\beta$ such that it minimizes the objective function along the search direction defined by $\tilde{s}_2$ also without actually updating the model.

Note that the fact that the method does not update the model parameters with the estimated step sizes represents one of the major differences between this two-pass line search method and the previously described one-pass line search method. Once the scaling factors are determined, a new search direction is formed using equation 4. A second pass line search is then performed using the new search direction $s_{new}$ to update both parameter classes, i.e. we try to find a step length $\lambda$ such that the objective function is minimized along direction $s_{new}$. This approach may be called the alternating two-pass line search method: the first pass line search determines the relative scaling among different search components, and the estimated scaling effectively rotates the original search direction to obtain a new search direction; then the second pass line search updates the model parameters using the new search direction. Since the scaling factors are determined by independent line searches, the scaling of the original search direction (or gradient) can then be corrected using the estimated scaling factors. The relative magnitudes of each component of the combined search direction are mainly determined by how sensitive each parameter class is along the basis vector, i.e., the sensitivity of $m_1$ along $s_1$, and the sensitivity of $m_2$ along $s_2$.

Practical Considerations and Extensions

Determination of Scaling by Exhaustive Line Search

In the alternating two-pass line search method disclosed herein, one objective is that the first pass line search finds proper scaling factors (step sizes) for each parameter class. In order to properly do so, an exhaustive line search may be performed to find the inflection points when performing the first pass line search. Taking inversion of two parameter classes for example, that means iteratively scanning the objective function values by perturbing the concatenated model m along search direction $\tilde{s}_1$ for a range of perturbation strengths (effectively, this means scanning $m_1$ along $s_1$, because the second component of $\tilde{s}_1$ is zero). The line search is terminated when the objective function value is bigger than the previous objective function value. The returned $\alpha$ is used as the scaling factor to weight the search direction for the first parameter class. An algorithm is described next that illustrates an exhaustive line search:
do while $\alpha_i \leftarrow \alpha_i + \Delta \alpha$ compute $J(m + \alpha_i \tilde{s}_1)$ if $J(m + \alpha_i \tilde{s}_1) > J(m + \alpha_{i-1} \tilde{s}_1)$, stop and return $\alpha = \alpha_i$ $i \leftarrow i + 1$ end
where $\Delta \alpha$ is a user-supplied increment value, and J is the objective function value. Similarly, the optimal scaling factor $\beta$ for the second parameter class can be found by perturbing m along search direction $\tilde{s}_2$.

Extended Methodology—Incorporating Cascaded Decomposition of Data Sets

Figure 7:
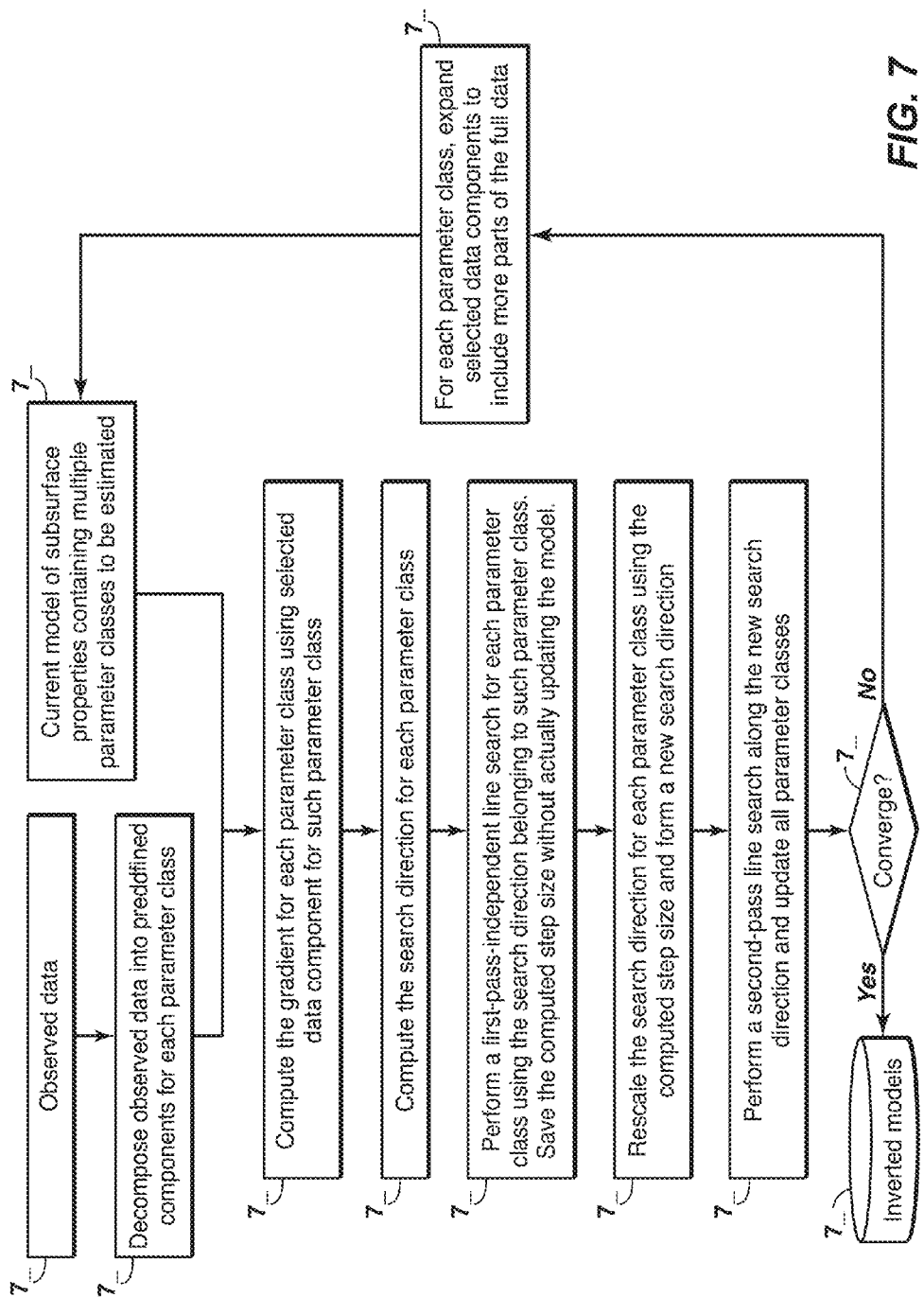
FIG. 7 is a flow chart showing basic steps in an extended alternating two-pass line search disclosed herein, in which a cascaded inversion approach is combined with the alternating two-pass line search.

The present inventive method can also be extended by incorporating the cascaded inversion method described in a companion patent application, "A Method for Estimating Multiple Subsurface Parameters by Cascaded Inversion of Wavefield Components," inventors Ayeni et al., which is incorporated herein by reference in all jurisdictions that allow it. This extension allows readily conditioning the estimated gradients (and hence search directions) using parts of the data most sensitive to individual parameter classes. The extended embodiment of the present inventive method is summarized in the flow chart of FIG. 7. The extended approach disclosed herein differs from that described in Ayeni et al. at least because, in the present invention, all parameter classes are simultaneously updated in every iteration whereas in the inversion taught by Ayeni et al., only one parameter class is updated at every iteration.

Cost Considerations for Multiple Line Searches

Compared to the conventional gradient-based first-order approaches, the alternating one/two pass approach requires performing many more line searches, which might be costly. To mitigate that issue, only a small subset(s) of the source shots may be used, which may preferably be randomly selected from the entire survey, to perform the line searches. These randomly selected shots can be used for the first pass and/or second pass line searches.

EXAMPLES

Figure 4A:
FIGS. 4A-4F show, for a test example of the present inventive method, the initial model and the final inverted model for two parameters (velocity and anisotropy), and compare the data after migration using the initial and final models.
Figure 4D:
Figure 4B:
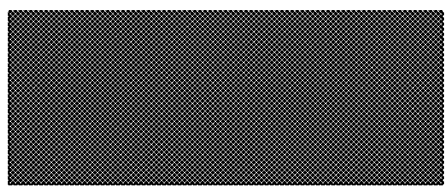
Figure 4E:
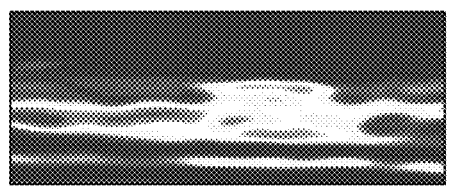
Figure 4C:
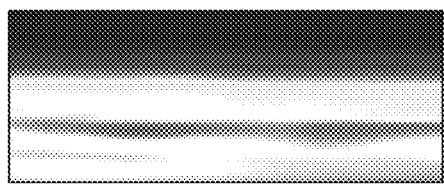
Figure 4F:

In a test example, the alternating two-pass line search method disclosed herein was applied to anisotropic VTI (vertical-transverse isotropic) inversion of a 3D field data example. In this example, two parameter classes were simultaneously inverted: Thompson's anisotropy parameter $\eta$ and Normal Moveout velocity $V_{NMO}$. During the inversion, the other Thompson anisotropy parameter $\delta$ is set equal to zero, and it is fixed throughout the inversion. FIGS. 4A-4F compare the models and migrated gathers derived from the initial and inverted models. FIGS. 4A and 4D show Kirchhoff depth migration gathers derived from the initial (4A) and final (4D) models. FIGS. 4B and 4E show the initial and final $\eta$ models respectively, while FIGS. 4C and 4F show the initial and inverted $V_{NMO}$ models. Note that the migrated gathers migrated using the FWI inverted models of $V_{NMO}$ and $\eta$ derived from the alternating two-pass line search method (the migrated gathers shown in FIG. 4D) are flat relative to the gathers shown in FIG. 4A that were migrated using the starting models—indicating accuracy of the derived models.

The foregoing description is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined by the appended claims. As will be apparent to those who work in the technical field, all practical applications of the present inventive method are performed using a computer, programmed in accordance with the disclosures herein.

REFERENCES

Kennett, B. L. N., M. S. Sambridge, and P. R. Williamson, "Subspace methods for large inverse problems with multiple parameter classes," *Geophysical Journal* 94, 237-247 (1988).

The invention claimed is:

1. A computer-implemented method for iteratively inverting seismic data to simultaneously infer a model for at least two physical properties of the subsurface, said method comprising:
   (a) for each physical property, computing, with a processor, a gradient of an objective function with respect to parameters of the physical property, said objective function measuring misfit between all or part of the seismic data and corresponding model-simulated seismic data;
   (b) for each physical property, computing, with the processor, a search direction in model space from the gradient;
   (c) alternating line searches between or among the search directions for the at least two physical properties to determine, with the processor, optimal step sizes along each of the search directions;
   (d) using the optimal step sizes to update the model with the processor; and
   (e) generating, with the processor, an image of the subsurface displaying the at least two physical properties according to the updated model;
   wherein (c)-(d) comprise:
   (i) performing a first line search for a first physical property, using an initial model, and saving the optimal step size from the first line search but not updating the model yet;
   (ii) performing a second line search for a second physical property, using the initial model, and saving the optimal step size from the second line search but not updating the model yet;
   (iii) performing a line search using the initial model and saving the optimal step size as in (ii) for any additional physical properties being modeled; and
   (iv) using the saved step sizes from (i)-(iii) to compute a new search direction, then performing a second-pass line search along the new search direction, determining a second-pass optimal step size and using it to generate an updated model for a current iteration of the inversion.

2. The computer-implemented method of claim 1, wherein in (a) one or more parts of the seismic data are selected and used for computing the gradient for each physical property, said one or more parts being determined according to a selected criterion based on sensitivity of the physical property to the data.

3. The computer-implemented method of claim 2, further comprising, in a next iteration of the iterative inversion, expanding the selected part or parts of the seismic data for at least one of the at least two physical properties to include more parts of the seismic data.

4. The computer-implemented method of claim 1, wherein the first and second and any additional line searches in (iii) are exhaustive line searches, performed to find inflection points in the objective function as a function of the step size.

5. The computer-implemented method of claim 1, wherein some source shots in the seismic data are discarded and not used in the method in order to reduce computing cost and time.

6. The computer-implemented method of claim 1, wherein the data inversion is full wavefield inversion.

7. The computer-implemented method of claim 1, wherein the at least two physical properties comprise at least two of P-wave velocity, S-wave velocity, normal move-out velocity, one or more anisotropy parameters, and attenuation.

8. The computer-implemented method of claim 1, wherein the search direction is computed without preconditioning the gradient with a Hessian of the objective function.

* * * * *